United States Patent
Gintz

(10) Patent No.: US 11,108,216 B2
(45) Date of Patent: *Aug. 31, 2021

(54) PANEL WIRE SUPPORT BRACKETS

(71) Applicant: sticNstac LLC, Boise, ID (US)

(72) Inventor: William Gary Gintz, Boise, ID (US)

(73) Assignee: sticNstac LLC, Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 16/867,492

(22) Filed: May 5, 2020

(65) Prior Publication Data

US 2020/0335954 A1 Oct. 22, 2020

Related U.S. Application Data

(63) Continuation of application No. 16/123,969, filed on Sep. 6, 2018, now Pat. No. 10,644,486, which is a continuation-in-part of application No. 15/694,687, filed on Sep. 1, 2017, now Pat. No. 10,122,157, which is a continuation of application No. 15/156,145, filed on May 16, 2016, now abandoned.

(60) Provisional application No. 62/554,965, filed on Sep. 6, 2017, provisional application No. 62/161,696, filed on May 14, 2015.

(51) Int. Cl.
| | |
|---|---|
| *H02G 3/04* | (2006.01) |
| *F16L 3/08* | (2006.01) |
| *F16L 3/223* | (2006.01) |
| *H02G 3/32* | (2006.01) |

(52) U.S. Cl.
CPC .............. *H02G 3/0437* (2013.01); *F16L 3/08* (2013.01); *F16L 3/223* (2013.01); *H02G 3/0456* (2013.01); *H02G 3/32* (2013.01)

(58) Field of Classification Search
None
See application file for complete search history.

(56) References Cited

U.S. PATENT DOCUMENTS

| | | | |
|---|---|---|---|
| 1,930,928 A | 10/1933 | Dunlap | |
| 2,023,083 A | 12/1935 | Knell | |
| 2,451,699 A | 10/1948 | Twaroski | |
| 2,661,483 A | 12/1953 | Tortorice | |

(Continued)

OTHER PUBLICATIONS

U.S. Patent and Trademark Office, Non-Final Office Action in U.S. Appl. No. 16/123,969, dated Jun. 11, 2019, 14 pages.

*Primary Examiner* — Monica E Millner
(74) *Attorney, Agent, or Firm* — Kolisch Hartwell, P.C.

(57) ABSTRACT

A panel wire support bracket may provide for support of a plurality of insulated electrical wires adjacent a building stud. The bracket may include an end cap including a stud face for flush fastening to the building stud, and a support bar with a plurality of holes and guide walls that extend downward from the holes. Each guide wall may define a guide tube having an upper opening and a lower opening configured to receive one of the wires for insertion through the upper opening and the lower opening. The holes and guide walls may be configured for locating and slidably supporting the wires passing through the holes. The guide walls may include flexible support for the wire with a protrusion to contact the wire. The flexible support may also include a tab operable for moving the protrusion away from contact with the wire. The holes may define hexagonal shapes and the guide walls may taper inwardly from the hole.

20 Claims, 12 Drawing Sheets

(56) References Cited

U.S. PATENT DOCUMENTS

| | | | |
|---|---|---|---|
| 2,813,692 A | 11/1957 | Bremer et al. | |
| 2,824,312 A * | 2/1958 | Tortorice | E03C 1/042 |
| | | | 4/695 |
| 2,889,016 A | 6/1959 | Warren | |
| 2,921,607 A | 1/1960 | Caveny | |
| 3,690,609 A * | 9/1972 | Montesdioca | E04G 21/185 |
| | | | 248/68.1 |
| 4,907,766 A | 3/1990 | Rinderer | |
| 5,060,892 A | 10/1991 | Dougherty | |
| 5,277,006 A | 1/1994 | Ruster | |
| 5,478,174 A | 12/1995 | Lenhart | |
| 5,593,115 A | 1/1997 | Lewis | |
| 5,615,850 A | 4/1997 | Cloninger | |
| 5,834,693 A | 11/1998 | Waddell et al. | |
| 5,971,329 A | 10/1999 | Hickey | |
| 5,992,802 A | 11/1999 | Campbell | |
| 6,053,456 A | 4/2000 | Dispenza | |
| 6,158,066 A * | 12/2000 | Brown | E03C 1/021 |
| | | | 4/695 |
| 6,278,061 B1 | 8/2001 | Daoud | |
| D448,650 S | 10/2001 | Vrame | |
| 6,347,714 B1 * | 2/2002 | Fournier | G02B 6/4452 |
| | | | 211/26 |
| 6,375,128 B1 | 4/2002 | Condon et al. | |
| 6,388,192 B1 | 5/2002 | Layne | |
| 6,423,898 B1 | 7/2002 | Croker | |
| 6,489,565 B1 | 12/2002 | Krietzman et al. | |
| 6,595,476 B1 | 7/2003 | Edwards | |
| 6,796,335 B1 | 9/2004 | Hubbard et al. | |
| 7,014,152 B2 | 3/2006 | Grendahl | |
| 7,017,866 B2 | 3/2006 | Whorton | |
| 7,039,965 B1 * | 5/2006 | Ismert | E03C 1/021 |
| | | | 248/56 |
| 7,285,027 B2 | 10/2007 | McGrath et al. | |
| 8,656,668 B2 * | 2/2014 | Monden | H02G 3/22 |
| | | | 52/232 |
| 8,695,929 B2 | 4/2014 | Cox | |
| 8,998,154 B2 | 4/2015 | Lupsa et al. | |
| 9,169,948 B2 | 10/2015 | Buttars | |
| 9,935,444 B1 * | 4/2018 | Gardner | E04B 1/34869 |
| 10,122,157 B1 * | 11/2018 | Gintz | F16L 3/223 |
| 10,644,486 B2 * | 5/2020 | Gintz | H02G 3/0437 |
| 2001/0022231 A1 | 9/2001 | Dyer | |
| 2009/0179116 A1 | 6/2009 | St-Louis et al. | |
| 2010/0133391 A1 | 6/2010 | Taylor | |

* cited by examiner

PANEL WIRE SUPPORT BRACKETS

CROSS-REFERENCE TO RELATED APPLICATION

This application is a continuation of U.S. patent application Ser. No. 16/123,969, which is a continuation-in-part of U.S. patent application Ser. No. 15/694,687, entitled PANEL WIRE SUPPORT BRACKETS, which is a continuation of U.S. patent application Ser. No. 15/156,145, which claims priority to U.S. Provisional Patent Application Ser. No. 62/161,696, the entireties of all of which are hereby incorporated by reference for all purposes. U.S. patent application Ser. No. 16/123,969 also claims the benefit under 35 U.S.C. § 119(e) of the priority of U.S. Provisional Patent Application Ser. No. 62/554,965, filed Sep. 6, 2017, the entirety of which is hereby incorporated by reference for all purposes.

FIELD OF THE DISCLOSURE

This disclosure relates to PANEL WIRE SUPPORT. More particularly, this disclosure relates to improved systems and methods for supporting, protecting, organizing, and labeling electrical cables and/or wires, to facilitate proper connection of those cables or wires to an electrical panel.

BACKGROUND OF THE DISCLOSURE

Electrical panels, also known as main service panels, electrical main enclosures, or breaker boxes, are found in residential, commercial, and industrial structures. Electrical panels provide a primary connection point for electricity supplied to the structure from an electrical utility, and contain numerous breakers and individualized terminations for electrical cables or wires. The cables or wires often take the form of non-metallic sheathed cables (NM and NMC, also known as Romex-type cables, and SER cables) which are often found in residential structures, or of conduit-protected cables which are often found in commercial and industrial structures. In some situations, other cables, such as fiber optic cables, may be supported. Examples of electrical panels and various non-metallic sheathed cables and/or conduit-protected cables are disclosed in U.S. Pat. Nos. 5,784,249; 7,381,907; 7,405,923; 7,616,432; and USD702198.

The most common panel wire support found in many structures in the United States is a 2×6 or a 2×4 that spans the distance between two studs, approximately 12-inches above an electrical panel suspended between those two studs. The 2×6 (or 2×4) is oriented with the longer dimension running parallel to the corresponding wall, and cables, wires, and/or conduit are stapled to the exposed larger face of the 2×6 (or 2×4). Examples of specific wire supports are disclosed in U.S. Pat. Nos. 6,996,943 and 8,505,858, and U.S. Patent Application Publication No. US20170063064.

In new construction, a popular method for supporting wires is to cut a 2×6 (or 2×4) piece of wood to a length equal to the width of an electrical panel and toenail (affix with nails driven in at an angle) said piece of wood between the studs 12-inches above the electrical panel. A worker can then lay cables and/or wires over the top of the length of 2×6 (or 2×4) and individually staple the cables or wires to the piece of wood. Problems with this method include the time and effort involved, and possible damage to the cables and/or wires before they reach the panel. In addition, this method does not quite comply with the National Electric Code, putting the supporting of the wires against code by ¼ inch.

Other types of supports for wires, cables, and conduit are disclosed in U.S. Pat. Nos. 2,921,607; 4,291,855; 4,440,374; 5,653,411; 5,669,590; 6,222,128; 6,313,406; 6,513,766; 6,655,644; 6,857,606; 7,301,101; 7,347,401; 7,608,782; 7,784,751; U.S. D407963; U.S. D663274; US2001/0022231; and US2007/0137888.

The disclosures of these and all other publications referenced herein are incorporated by reference in their entirety for all purposes. However, none of these other types of supports are both configured to support the large and varied collection of cables such as might need to be passed into an electrical panel and designed to be easily installed between two studs in a stud wall above an electrical panel at any desired height. For at least this reason, there is a need for a panel wire support that can be affixed easily and quickly between two studs some distance apart at some known distance above (or below) an electrical panel, that supports and holds fixed a large number of cables and/or wires without damaging them.

SUMMARY OF THE DISCLOSURE

A panel wire support is a structure that supports, protects, aligns, organizes and/or labels a collection of electrical cables or wires before they enter and/or engage with, or after they exit, an electrical panel such as those described above. The advantages of such a panel wire support may include facilitating proper alignment of the cables or wires for when they engage with the electrical panel, preventing cables or wires from bending or being displaced, and/or preventing damage to connections due to extraneous movement of the cables or wires. For these and other reasons it may be desirable or even required to provide a fixed support for cables or wires a set distance away from an electrical panel. In the U.S., it is required by the National Electric Code to support cables or wires within 12 inches of an electrical box (National Electric Code ref. 334.30).

The present panel wire support bracket is disclosed in several different embodiments. A carefully engineered panel wire support bracket fits between two studs in a stud wall, and is attached at each side to one of the studs it is mounted between. The panel wire support bracket according to the present disclosure may be molded as a single element. In some examples, a panel wire support bracket may be molded as multiple elements which are then attached together.

At either end of the main body of the panel wire support bracket are end flaps that may be hingedly connected to the main body. The end flaps are configured to be affixed to the studs between which the panel wire support is to be installed. The hinged connection allows the end flaps to flex in or out as needed depending on the distance between the studs. Each end flap has a pair of flanges for releasably engaging with the side walls of the main body of the panel wire support bracket when the end flaps are folded down to be perpendicular to the upper plate of the panel wire support bracket. This engagement helps to support and stabilize the side walls.

The panel wire support bracket is preferably mounted approximately 12-inches (12", with " being used below to indicate inches) above an electrical panel in new home construction or new building construction. The body of the support bracket may be molded with visual and tactile indicators approximately 12" from each of the end plates making such placement easy and convenient.

The top surface of the panel wire support bracket has a series of holes going from top to bottom of the bracket through approximately a 1½" thickness. These holes are configured to accommodate, for example, individual NM and NMC (Romex-type) cables such as those discussed above. In some embodiments, the holes may be configured to accommodate MC cables, of the type more commonly used in commercial work. The individual holes in the bracket are situated in a central portion of the wall so as to keep wires at least 1¼" from any drywall or surface layer at the front or the back of the stud wall. That is, the holes are situated substantially within a 1" "central plane" of the wall. Wires that might otherwise have been stapled to the side of the 2×6 (or 2×6) piece of wood, are now supported approximately 12" above the panel by inserting the wires through the individual, designated holes before terminating at the panel.

For additional support, each hole may include one or more features that increase its holding or gripping effect. The guide walls of the individual holes help to prevent the wire from being easily moved within or through the hole by random movements of the wire. In addition, each hole may include one or more protrusions formed on a flexible support. Such protrusions may be easily releasable due to an extension tab arranged such that a gap remains between the tab and any wire or cable being held within the opening. An installer may use the extension tab to pull the flexible support, and thus the protrusion, away from the wire to more easily insert or remove a wire when desired.

Some embodiments of the panel wire support bracket may include a legend area for marking the wire, so that it is easy for an installer to determine and keep track of which cable should be connected to a particular breaker or terminal. Many embodiments of the panel wire support bracket are nonmetallic, but some embodiments may be metallic or may include metallic components.

In an exemplary method of use, an electrician will hold one of the disclosed support brackets in place between two vertical studs with one hand, and use a power drill with a magnetized Philips-head screwdriver bit (for example) in the other hand. A Philips-head screw (for example) can be grabbed magnetically, after which the electrician uses the power drill to attach one end flap of the support bracket to a vertical stud within the wood frame. This may take less than 5 seconds. The electrician can then use the same process to attach the other end flap of the support bracket to the other stud, in the same fashion. The electrician will then proceed to insert several cables or wires into the holes on a top surface of the support bracket and pull the cables or wires through from a bottom of the support bracket.

Advantages of the present disclosure will be more readily understood after considering the drawings and the following Detailed Description.

The drawings illustrate embodiments of PANEL WIRE SUPPORT BRACKETS according to the present disclosure. The purpose of these drawings is to aid in explaining the principles of the invention. Thus, the drawings should not be considered as limiting the scope of the invention to the embodiments and schematic concepts shown therein. Other embodiments of PANEL WIRE SUPPORT BRACKETS may be created in accordance with aspects of the present disclosure and these other embodiments are intended to be included within the scope of patent protection.

DETAILED DESCRIPTION OF THE DISCLOSURE

Examples of panel wire support brackets are shown in FIGS. 1-19. Unless otherwise specified, a panel wire support may, but is not required to contain at least one of the structures, components, functionalities, and/or variations described, illustrated, and/or incorporated herein.

Figure 1:
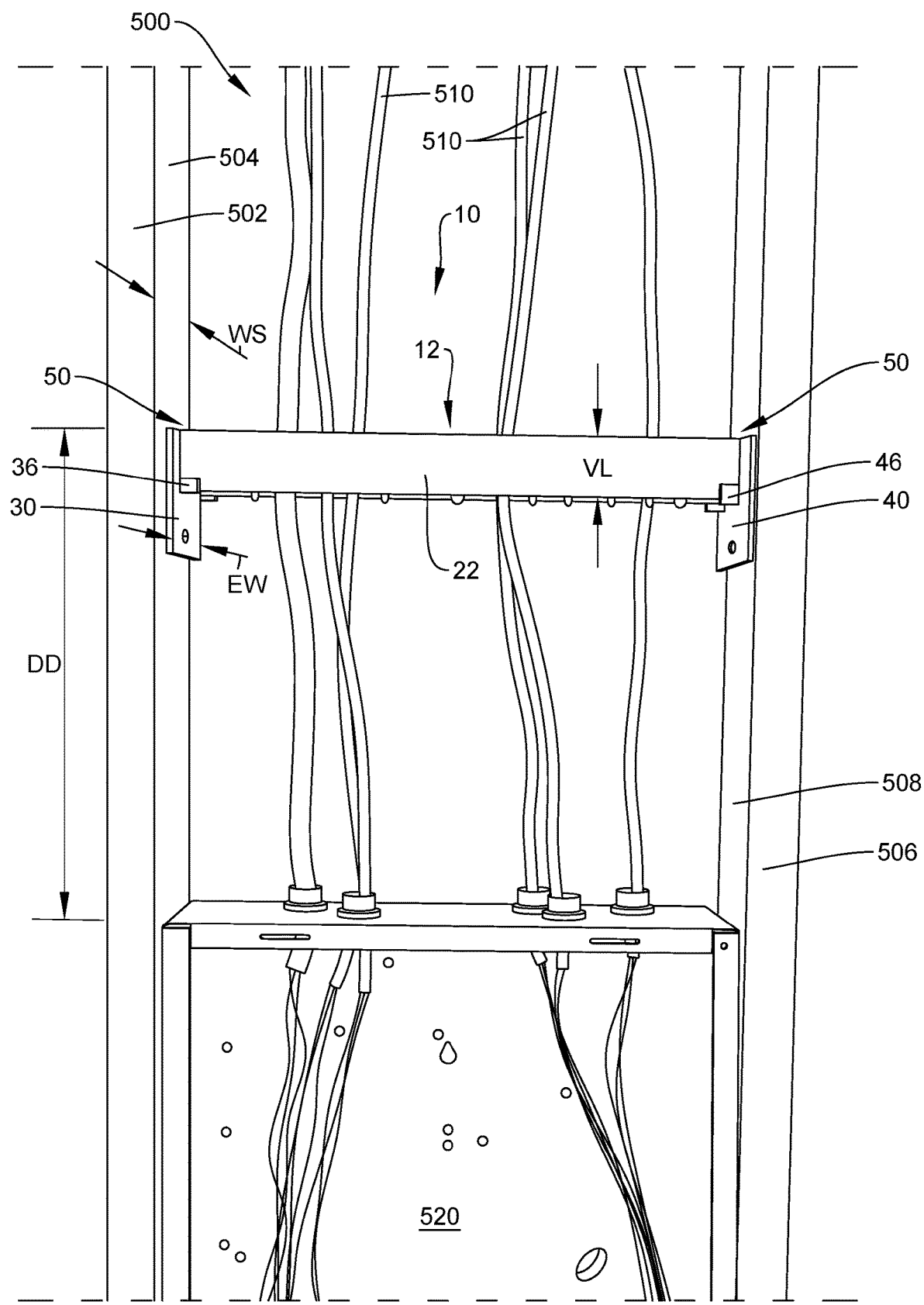
FIG. 1 is a view of a panel wire support bracket installed above an electrical panel.

Overview: FIG. 1

The present disclosure relates to support brackets for use when installing electrical wiring inside building walls. As seen in FIG. 1, a support bracket 10 is molded as a single piece and includes a main body 12 with a first end 14 and a second end 16. Main body 12 also includes an upper plate 20, a first side wall 22, and a second side wall 24. Upper plate 20 includes a plurality of holes 18. At first end 14 of main body 12 is a first end flap 30 and at second end 16 of main body 12 is a second end flap 40. Support bracket 10 may include any suitable material configured to be durable and resilient and to allow for flexible hinges and guide walls. In some examples, support bracket 10 may be constructed out of any suitable materials including polypropylene or other suitable plastics, or metals such as aluminum. Support bracket 10 may be constructed using any suitable technique, such as injection molding or 3D printing techniques. Any material suitable to the proposed use in supporting electrical wiring may be used, e.g., polyethylene or polypropylene. As more specific examples the polypropylene manufactured by Flint Hills Resources of Longview, Tex. as P5M6K-048 or the polypropylene manufactured by PolyOne Corporation of Avon Lake, Ohio as Maxxam™ FR PP 301 Black 1284-11 S Polypropylene may be used. The bracket may be produced in any suitable color, such as black, white, clear, or translucent. Preferably, the material is approved by UL for the intended use.

Support bracket 10 is shown in FIG. 1 installed in a stud wall 500 between a first building stud 502 and a second building stud 506. The plurality of holes and/or openings in main body 12 securely but releasably hold a plurality of cables and/or wires 510. Holes 18 (see FIGS. 2-4) may include a variety of shapes to support a variety of sizes of wires 510.

As can be seen in FIG. 1, each of end flaps 30 and 40 are hingedly attached to main body 12 by a flexible hinge 50 so that each end flap may fold down and be attached to an inner face 504 of stud 502 or an inner face 508 of stud 506 inside building wall 500. End flaps 30 and 40 have an end width EW that is equal to or larger than an upper plate width PW (see FIG. 10) and less than or equal to a width of the building studs WS. In some examples, upper plate width PW is approximately equal to 1½" and width of the building studs WS is approximately 4" or 6". In some examples, end width EW approximately equals width of the building studs WS, which makes alignment of end flaps 30 and 40 with outer edges of studs 502 or 506 simple and consistent. A plurality of nail or screw holes 52 may be preformed in each of end flaps 30 and 40 so that an installer knows exactly where to attach end flap 30 or 40 to stud 502 or 506 and to prevent the extra expenditure of time and effort that may be needed to drill holes in the end flaps or otherwise modify support bracket 10 to be affixed to wall 500. Nail or screw holes 52 may include any suitable structure configured to allow attachment of support bracket 10 to studs 502 and/or 506 by means of a fastener or a plurality of fasteners. A fastener may include any suitable device configured to attach support bracket 10 to studs 502 and/or 506. In some examples, a fastener may be a nail, a screw, a rivet, a bolt, and/or any other suitable device.

The flexible hinge connections allow end flaps 30 and 40 to pivot, as discussed above, and they also allow for some variation in spacing between inner faces 504 and 508 of studs 502 and 506 respectively. End flaps 30 and 40 may tilt outwardly or inwardly to span a greater or lesser expanse between two studs. Furthermore, the flexible hinge connection allows for some compressibility in hinge 50, so that a folded configuration of support bracket 10 may be squeezed into a slightly smaller expanse between two studs. As an example of the flexible hinge accommodating variation in the spacing between two studs, studs are typically spaced at about 16" on center, leaving a nominal space between stud faces of about 14½" (for 1½"-wide studs). The flexible hinge typically allows installation in between stud inner faces that are at least about 14½" apart as well as between faces that are no more than about 14¼" apart.

Figure 6:
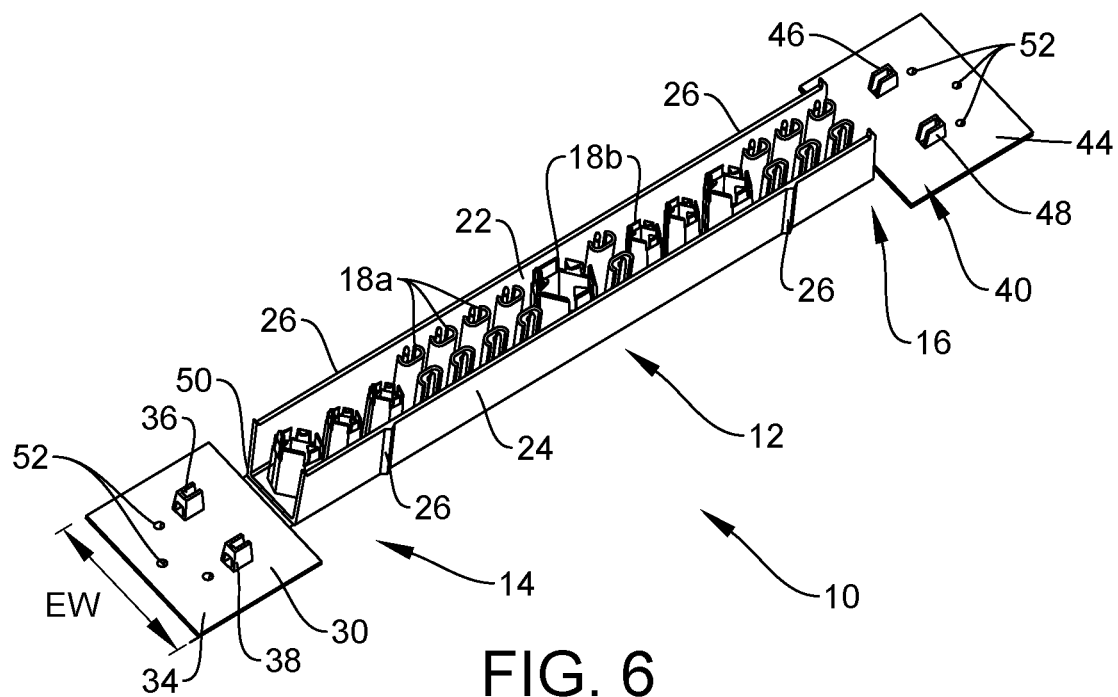
FIG. 6 is a bottom perspective view of the embodiment of FIG. 2 that shows the distance indicators.

In FIG. 1, support bracket 10 is mounted a distance DD above a main power panel 520 inside stud wall. Most building codes in the United States require that a support bar, such as support bracket 10, be mounted a distance above a main power panel (corresponding to distance DD above main power panel 520) that is approximately equal to 12". As best seen in FIG. 6, support bracket 10 makes measurement of distance DD accurate and easy by including a predefined indicator 12" from an opposite end flap. Preferably, support bracket 10 includes an indicator 26 at four locations, so that reliable measurements may be made regardless of the orientation of the support bracket relative to an installer.

Holes 18 in upper plate 20 are arranged to correspond generally to a corresponding pattern of holes used by many manufacturers of main power panels. Two different embodiments, having two different possible arrangements of holes, are shown in FIGS. 2-9 and FIGS. 10-12 respectively. Other patterns of pre-defined holes may be included in other embodiments.

First Embodiment: FIGS. 2-9

Figure 2:
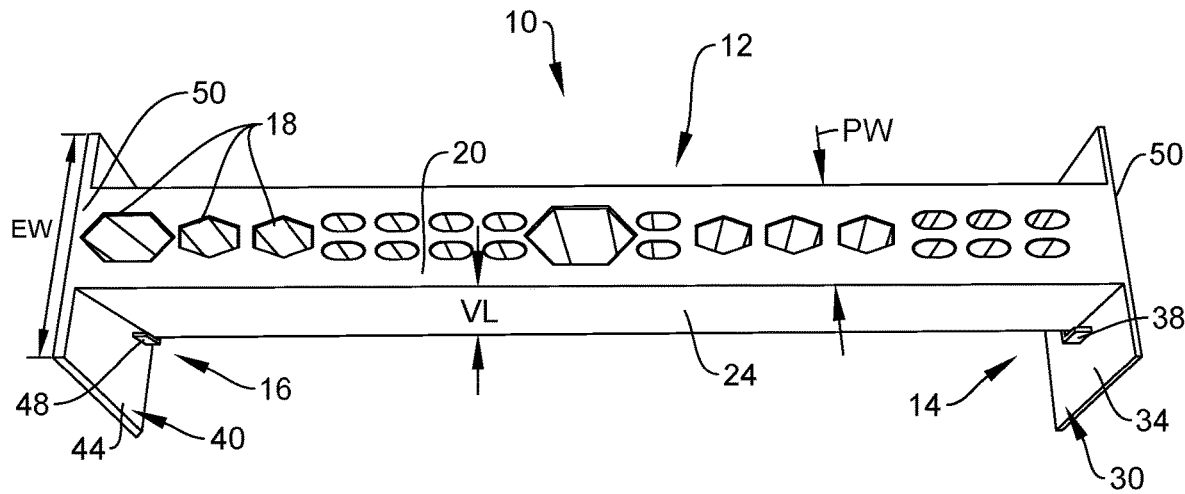
FIG. 2 is a view from a top perspective of an embodiment of a panel wire support bracket in accordance with aspects of the present disclosure.
Figure 3:
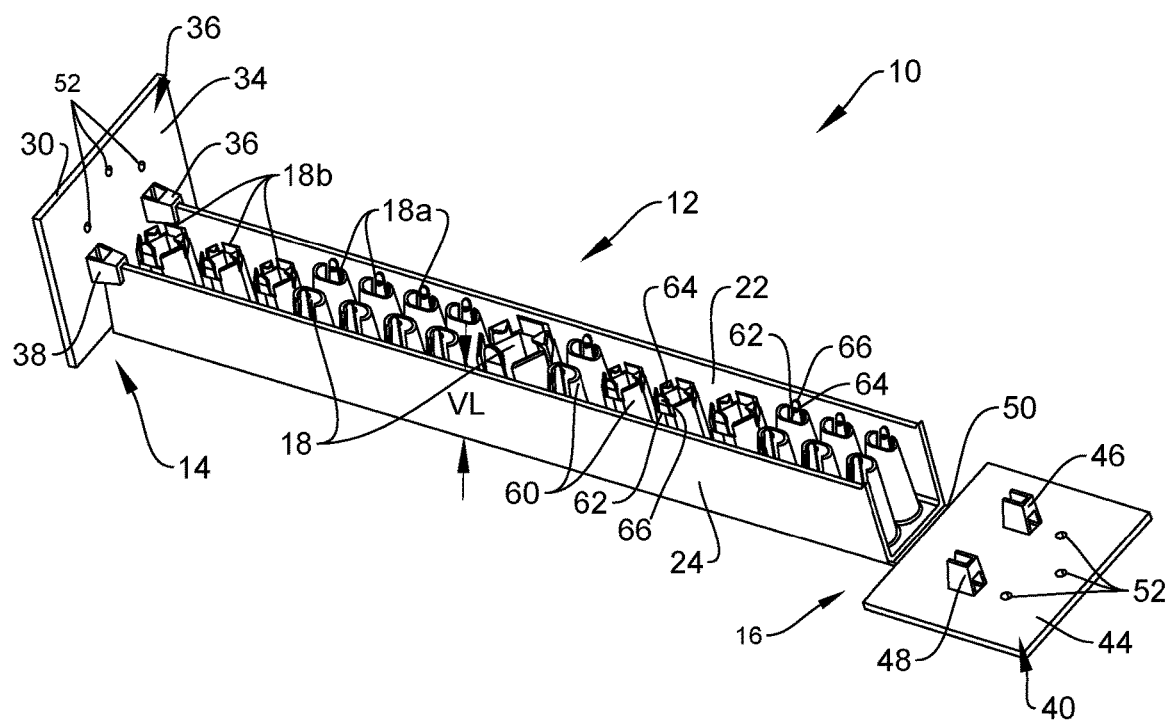
FIG. 3 is a bottom perspective view of the embodiment of FIG. 2. In this drawing, one of the end flaps is unfolded to better show the guide walls of the holes and the other end flap is folded to show how the flanges engage with the side walls.
Figure 4:
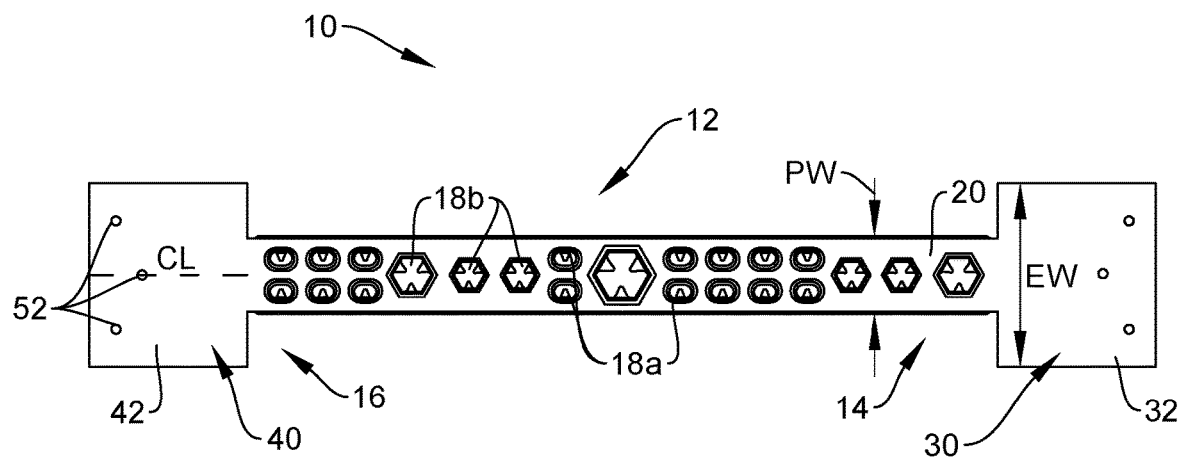
FIG. 4 is a top view of the embodiment of FIG. 2.
Figure 5:
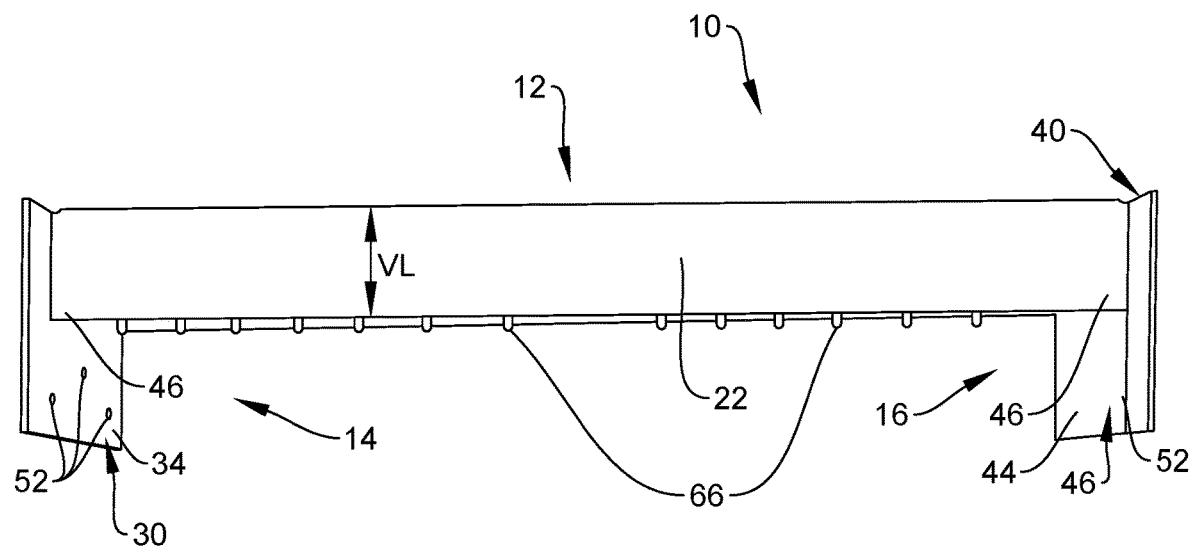
FIG. 5 is a side view of the embodiment of FIG. 2.
Figure 7:
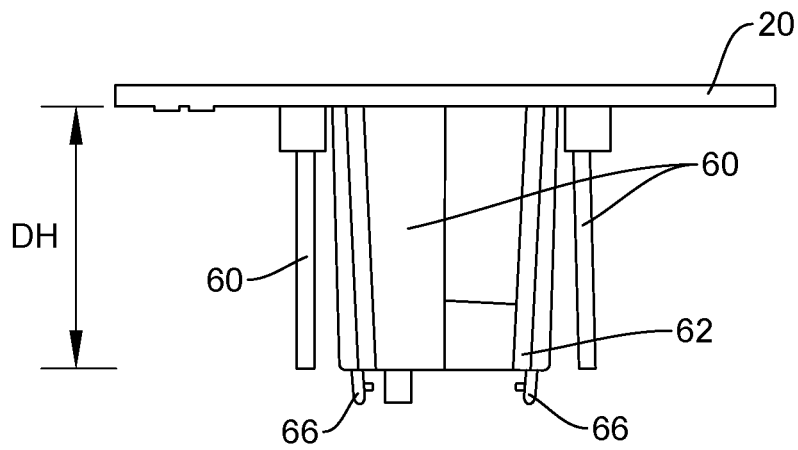
FIG. 7 is a side view of one of the holes in a panel wire support bracket. This diagram shows the guide walls of the hole.
Figure 8:
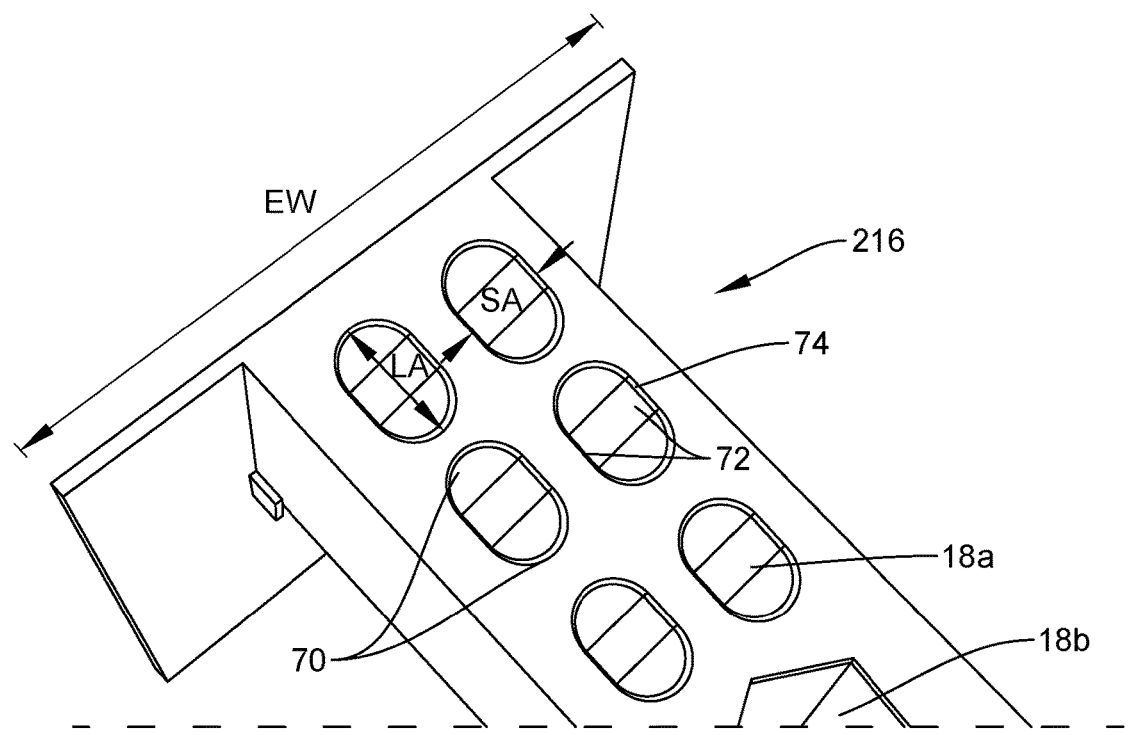
FIG. 8 is a top perspective view of one end of the embodiment of FIGS. 2-6 that better shows the tops of the elongated holes.
Figure 9:
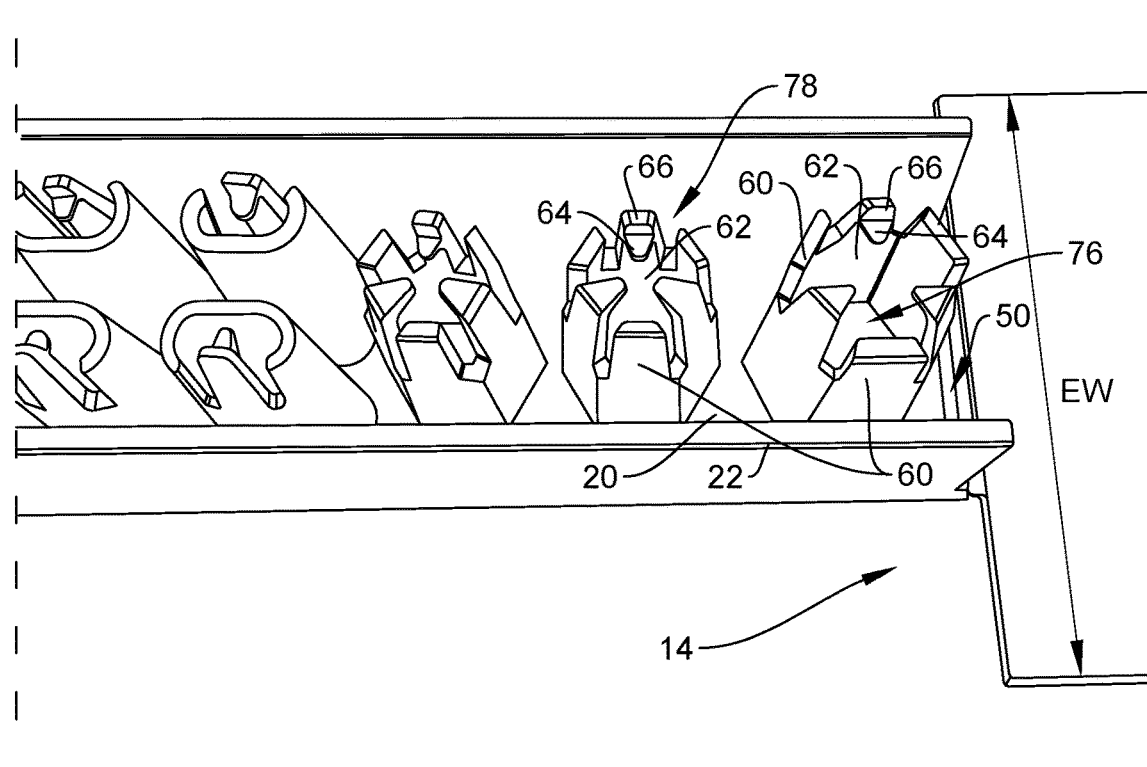
FIG. 9 is a bottom perspective view of the other end of the embodiment of FIGS. 2-6 that better shows the guide walls of the holes.

FIGS. 2-9 show a first embodiment of the invention. FIG. 2 is a top perspective view of the first embodiment. FIG. 3 is a bottom perspective view of the first embodiment where one end flap is folded in and the other is folded out. FIG. 4 is another top view where the end flaps are folded out and FIG. 5 is a side view where the end flaps are folded in. FIG. 6 is a bottom perspective view that shows the distance indicators. FIG. 7 shows the guide walls of a hole. FIG. 8 is a top perspective view of a second end of the embodiment and FIG. 9 is a bottom perspective view of a first end of the embodiment.

As in FIG. 1, main body 12 includes upper plate 20 (defining upper plate width PW) and side walls 22 (visible in FIGS. 3, 5, and 9) and 24. Side walls 22 and 24 define a vertical length VL. In this embodiment, PW is approximately equal to 1½" and VL is approximately equal to 1½". In some examples, PW may be any suitable width and VL may be any suitable length. Upper plate 20 of main body 12 includes holes 18, each having a plurality of guide walls 60 as well as a flexible support 62 having a protrusion 64 and a tab 66.

End flap 30 is hingedly attached to main body 12 by hinge 50. End flap 30 has a stud face 32 (see FIG. 4) which is generally flat and a support face 34 which is generally parallel and opposite stud face 32. Support face 34 of end flap 30 also includes a first flange 36 and a second flange 38 each of which extend outwards from support face 34. Flanges 36 and 38 may include any suitable structure configured to couple with and support side walls 22 and 24 respectively.

End flap 40 is preferably shaped substantially identically to end flap 30 and is hingedly attached to main body 12 by hinge 50. End flap 40 has a stud face 42 (see, e.g., FIG. 4) which is generally flat and a support face 44 which is generally parallel to and opposite stud face 42. Support face 44 of end flap 40 also includes a first flange 46 and a second flange 48 each of which extend outwards from support face 44. Flanges 46 and 48 may include any suitable structure configured to couple with and support side walls 22 and 24 respectively.

In FIG. 2, end flaps 30 and 40 are folded down at hinges 50 so that they lie perpendicular to the plane defined by upper plate 20. Flanges 38 and 48 are visible and engage with side wall 24. In FIG. 3, flanges 36 and 46 are also visible; here, flanges 36 and 38 engage side walls 22 and 24 respectively at first end 14 of main body 12 while flanges 46 and 48 at second end 16 of main body 12 do not engage the side walls. Flanges 36, 38, 46, and 48, when engaged with side walls 22 and 24 serve to hold the side walls in place and prevent twisting or unintended movement of the main body.

As best seen in FIGS. 2 and 4, end flaps 30 and 40 define end width EW which is greater than or equal to upper plate width PW. In addition, end flaps 30 and 40 define a centerline CL, which centerline CL is vertical when flaps 30 and 40 are folded in. Main body 12 is typically centered on vertical centerline CL.

As best seen in FIGS. 3 and 4, end flaps 30 and 40 may include predefined nail/screw holes 52. Predefined nail/screw holes 52 such as those in FIGS. 3 and 4 facilitate installment of support bracket 10 as they show the installer the best position for fasteners (for example nails or screws). They also prevent the need to drill holes in the end flaps or to otherwise modify the end flaps to allow attachment of the end flaps to studs 502 and 506. Holes 52 may include any suitable shape configured to facilitate coupling of the end plate to the inner surface of a building stud by any suitable fastener.

As mentioned above, hinges 50 which connect end flaps 30 and 40 to main body 12 allow end flaps 30 and 40 to pivot relative to main body 12 and thus allow for some variation in spacing between studs 502 and 506 to which panel wire support 10 is affixed. End flaps 30 and 40 may tilt in an outward direction (in the direction shown by the end flaps in FIGS. 4, 5, and 9, and by end flap 40 in FIG. 3) or inwardly (as in FIGS. 2, 6, and 8, and end flap 30 in FIG. 3) as needed to span a greater or lesser expanse between two studs. Hinges 50 are also flexible to allow some compressibility of the support bracket such that a folded configuration of support bracket 10 (as in FIGS. 2 and 5) may be squeezed into a smaller expanse between two studs.

Many of predefined holes 18 in main body 12 are shaped to reliably hold specific types of wires, and the shape and/or ornamental features of each hole 18 helps an installer identify which hole 18 to use for a particular type of wire 510. For example, some of the holes (e.g. a plurality of elongated holes 18a) are shaped to hold flat 2-wire and 3-wire cables, often known by the name of an outer sheathing, such as Romex cable. Wires inside Romex cable may be of different thicknesses, typically 12-gauge or 14-gauge. In some examples, elongated holes 18a (best seen in FIG. 8) have a length LA of approximately ¾" parallel to a long axis, a width SA of approximately ½" parallel to a short axis, and two semicircular ends 70 connected to the straight edges 72 of the elongated predefined hole (this forms a shape similar to a rectangle where the short edges have been replaced by semi-circles). Holes 18a with the described elongated shape have been found to work particularly well with, for example, Romex-type cable. Internal guide walls 60 extend downward from elongated hole 18a, and taper inwardly so that a reduced opening is formed having a reduced length of approximately ⅝", a reduced width of approximately ⅜", and curved ends connecting reduced straight edges in a shape similar to the original elongated hole. In some examples, elongated holes 18a may be smaller or larger while retaining the same shape and/or the same ratios between dimensions.

This reduction in the size of the opening provides additional gripping ability and helps to prevent unwanted movement of the wire. The larger size of the opening at the top of the hole facilitates easier insertion of the wire into the hole by the installer. The edges of the opening at the top of the hole may include a bevel 74 or may otherwise be shaped to further facilitate the insertion of wires and to avoid sharp edges (this is particularly visible in FIG. 8). Guide walls 60 may be formed of flexible material to allow for some variation in the size of wires 510.

Some of holes 18 may be designed to hold other kinds of wires 510 and therefore may have other shapes. For example, FIGS. 2, 4, 10, and 11 show top views of a plurality of hexagonal holes 18b or 218b of a variety of sizes. In this embodiment, each hexagonal hole 18b or 218b may have a distance between opposite vertices measuring 1¼", 1", or ¾". In some examples, hexagonal holes 18b or 218b may have various sizes. Similar to elongated holes 18a for Romex wires, hexagonal holes 18b or 218b may have internal guide walls 60 that extend downward from the hexagonal hole. Guide walls 60 may taper inwardly so that a lower opening is formed having a hexagonal shape of a smaller size (for example 1⅛", ⅞", or ⅝" between opposite vertices) than the hexagonal opening in upper plate 20. The hexagonal shape of holes 18b or 218b may be advantageous for wires having a round or cylindrical shape. Other shapes or sizes of holes and internal walls may be suitable for other embodiments intended to hold other types or sizes of cables and/or wires.

For each hole 18, internal guide walls 60 define a guide tube 76 for an individual cable or wire. This is best seen in FIG. 9. Guide walls 60 define a hole depth DH (see FIG. 7) that is less than or equal to vertical length of side walls VL. Firm, releasable grip is provided inside each guide tube by multiple features. For example, the guide tubes formed by guide walls 60 of each hole 18 help to keep wires 510 aligned for easy manipulation near and/or inside a main power panel. The tapered shape of hole 18 (also discussed above) facilitates insertion of the wire and provides additional gripping ability.

Figure 18:
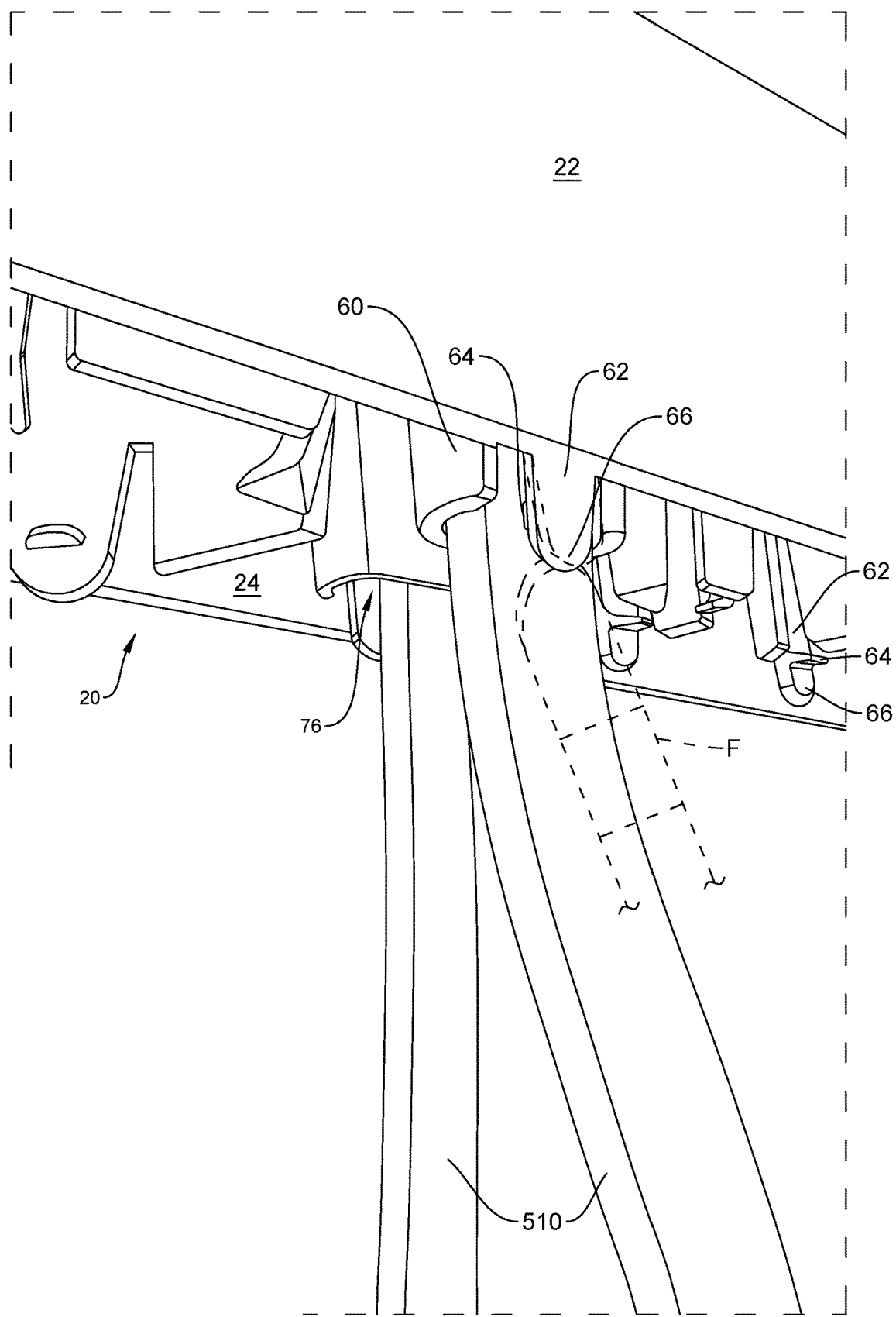
FIG. 18 is another bottom view of an embodiment of a panel wire support bracket installed above an electrical panel. Wires are shown installed in the bracket. The features of the guide walls are visible in this view and a finger is pulling on a tab to pull a protrusion away from a wire.

Furthermore, flexible support 62 may be formed by including at least two slits 78 in guide walls 60 (the hexagonal holes may have six slits, for example (see FIG. 9)). Still further, protrusion 64 may be preformed on flexible support 62 to increase the holding or gripping effect of flexible support 62 and to prevent the wire from moving in or out of or within the hole due to random or accidental movement of the wire. Releasability of the protrusion may be provided by tab 66, arranged so that a gap remains between tab 66 and any wire 510 that may be held by protrusion 64. As best seen in FIG. 18, an installer may grab tab 66 with a finger F, fingernail, or tool, as needed, and gently move a corresponding flexible support 62, and thus protrusion 64, away from a corresponding wire 510. Moving protrusion 64 away from the wire frees the wire for easy retraction or insertion. In the embodiment of FIGS. 2-9, protrusion 64 has a width of ⅛" and tab 66 has a length of 3/16". In some examples, protrusion 64 and tab 66 may have any suitable dimensions. Flexible support 62, protrusion 64, and tab 66 are best seen in FIGS. 9 and 18.

Figure 10:
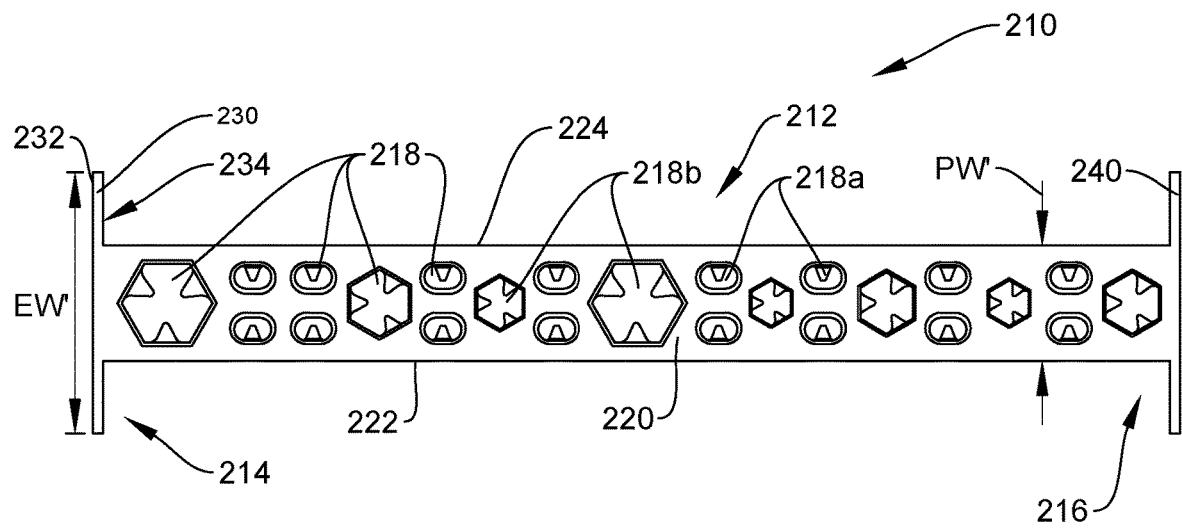
FIG. 10 is a top view of another embodiment of a panel wire support bracket in accordance with aspects of the present disclosure.
Figure 11:
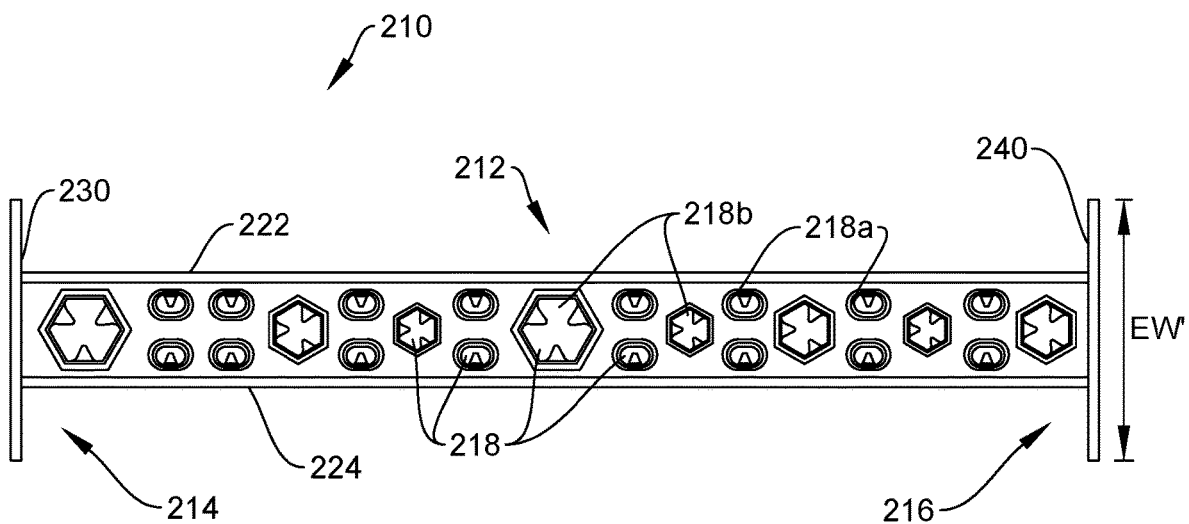
FIG. 11 is a bottom view of the embodiment of FIG. 10.
Figure 12:
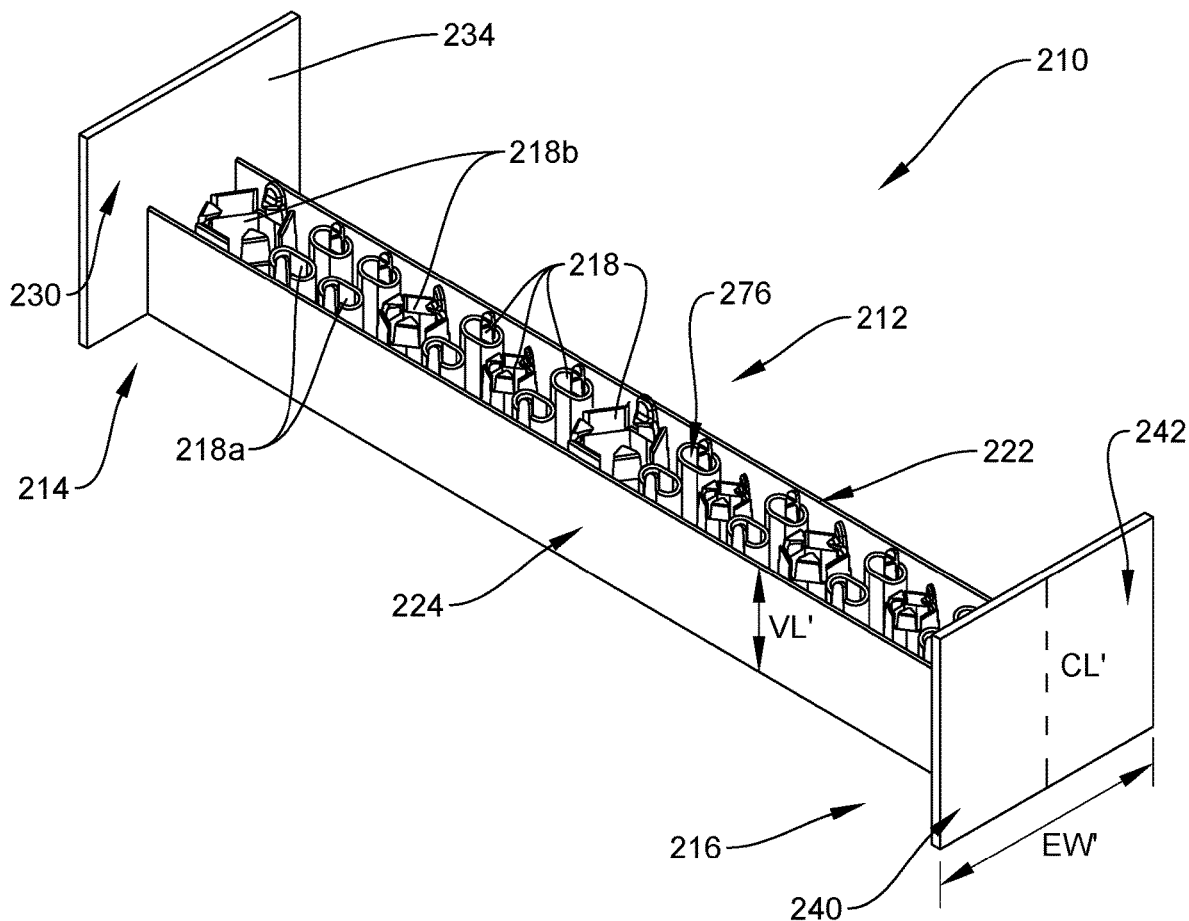
FIG. 12 is a bottom perspective view of the embodiment of FIGS. 10 and 11.

Second Embodiment: FIGS. 10-12

FIGS. 10-12 show a second embodiment of the present invention. FIG. 10 is a top view of the second embodiment and FIG. 11 is a bottom view of the second embodiment. FIG. 12 is a bottom perspective view of the second embodiment that shows the side walls and the end flaps. The primary difference between the first and second embodiments of the present invention is the use of a different configuration of holes 18. Different configurations of holes 18 (such as the first and second embodiments of this invention but also including any other suitable configuration of holes 18) or different shapes of individual holes 18 (such as 18a and 18b but also including any other suitable size or shape of hole) may be advantageous depending on the particular application of the invention and what kinds of wires 510 or type of electrical panel 520 is in use.

FIG. 10 shows a top view diagram of a second embodiment of the invention. A support bracket 210 has a main body 212 with a first end 214 and a second end 216. Main body 212 is comprised of an upper plate 220, two side walls 222 and 224 (visible in FIG. 12) and a plurality of holes 218. Side walls 222 and 224 define a vertical length VL'. In this embodiment, VL' is approximately 1½". In some examples, VL' may be any suitable length. Two end flaps 230 and 240 are hingedly connected to upper plate 220 by two hinges 250 (see FIG. 17) and have an end width EW (FIG. 12) and a vertical centerline CL'. Main body 212 is centered on vertical centerline CL' and has an upper plate width PW' which is less than or equal to end width EW'. In this embodiment, PW is 1½". In some examples, PW' may be any suitable width.

FIG. 11 is a bottom view of the second embodiment shown in FIG. 10.

FIG. 12 is a bottom perspective view of the embodiment of FIGS. 10 and 11. Here side walls 222 and 224 are visible, as are end flaps 230 and 240.

End flap 230 is hingedly attached to main body 212 by hinge 250. End flap 230 has a stud face 232 which is generally flat and a support face 234 which is generally parallel to and opposite stud face 232. End flap 240 is preferably shaped substantially identically to end flap 230 and is hingedly attached to main body 212 by hinge 250. End flap 240 has a stud face 242 which is generally flat and a support face 244 which is generally parallel to and opposite stud face 242. Support face 234 of end flap 230 and stud face 242 of end flap 240 are visible in FIG. 12.

As mentioned with respect to the first embodiment (support bracket 10), hinges 250 between end flaps 230 and 240 and main body 212 allow end flaps 230 and 240 to pivot relative to main body 212 and thus to allow for some variation in spacing between the studs to which panel wire support bracket 210 is affixed. End flaps 230 and 240 may tilt outwardly or inwardly (as in FIGS. 10-12) as needed to span a greater or lesser expanse between two studs. Hinges 250, like hinges 50, are flexible to allow for some compressibility so that a folded configuration of support bracket 210 (as best seen in FIG. 12) may be squeezed into a smaller expanse between two studs. As an example of the flexible hinge accommodating variation in the spacing between two studs, studs are typically spaced at about 16" on center, leaving a nominal space between stud faces of about 14½" (for 1½"-wide studs). The flexible hinge typically allows installation in between stud inner faces that are at least about 14½" apart as well as between faces that are no more than about 14¼" apart.

Many of predefined holes 218 in main body 212 are shaped to reliably hold specific types of wires and the shape and/or ornamental features of each hole 218 helps an installer identify which hole 218 to use for a wire 510 having a particular type or shape. Similar to what is shown for support bracket 10, support bracket 210 primarily has holes of two particular shapes: a plurality of elongated holes 218a similar to holes 18a which are designed to hold Romex cable of various gauges and a plurality of hexagonal holes 218b similar to holes 18b which are designed to hold round or cylindrical cables.

Holes 218 are tapered similarly to what was described above for holes 18 in support bracket 10; the reduction in size of the lower opening relative to the upper opening provides additional gripping ability and therefore helps to prevent unwanted movement of the wire. The larger size of the upper opening also facilitates easier insertion of the wire into the hole by the installer. A plurality of guide walls 260 may be formed of flexible material to allow for some variation in the size of wire 510.

Guide walls 260 define a guide tube 276 for wire 218 (see FIG. 12). Guide walls 260 define a hole depth DH' that is less than or equal to vertical length of side walls VL' (see FIG. 14). Firm, releasable grip is provided inside each guide tube by the multiple features described above in reference to holes 18. In particular, as in the first embodiment, guide walls 260 may include a flexible support 262. Flexible support 262 may include a protrusion 264 and a tab 266. Manipulation of tab 266 moves flexible support 262 and thus protrusion 264, in a manner similar to that shown for the embodiment of FIGS. 2-9 in FIG. 18. Movement of protrusion 266 allows or disallows unobstructed passage of the wire through the hole. In this embodiment, protrusion 264 has a width of ⅛" and tab 266 has a length of 3/16". In some examples, protrusion 264 and tab 266 may have any suitable dimensions.

Figure 13:
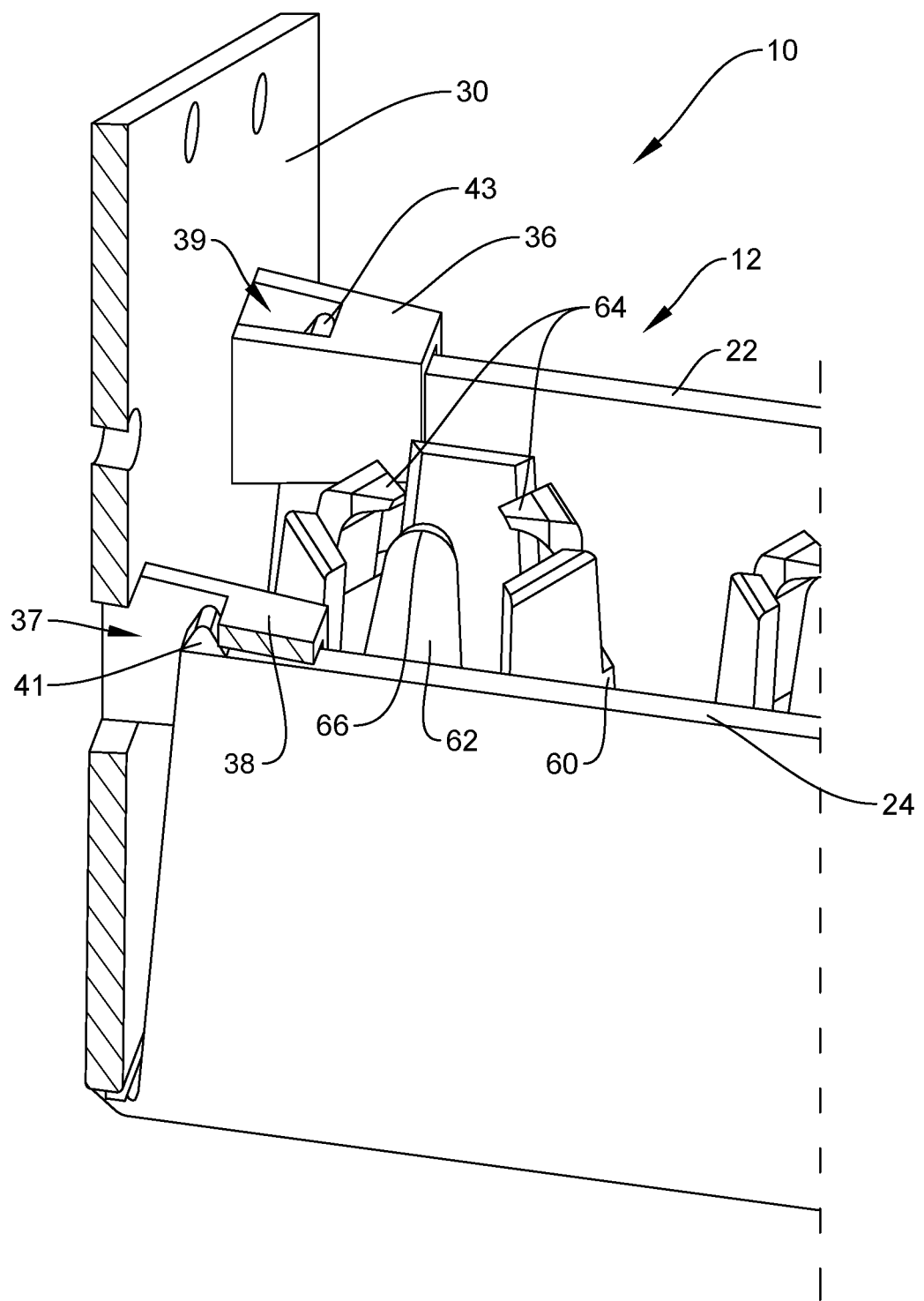
FIG. 13 is a side perspective sectional view of one end of the embodiment of FIGS. 2-6. Part of the end flap and part of one of the flanges is removed to show in more detail how the flanges engage with the side walls.

FIGS. 13-18 show more closely the details of the structure of some embodiments of the present disclosure. The details generally are substantially the same for corresponding structure of the various embodiments and may be described for the embodiment of FIGS. 2-9 or of FIGS. 10-12. FIG. 13 is a side perspective sectional view of one end of a support bracket and is described for the embodiment of FIGS. 2-9. Part of the end flap and part of one of the flanges is removed to show in more detail how the flanges engage with the side walls. End flap 30 may include flanges 36 and 38. Flanges 36, 38 and side walls 22, 24 may include a latching mechanism so that they may be releasably engaged when end flap 30 is fully folded in. For example, flange 36 may include a slot 39 and flange 38 may include a slot 37. When end flap 30 is fully folded in, slot 37 may engage a knob 41 and slot 39 may engage a knob 43 to couple the flap to the side walls in a folded-in position. End flap 40 may include similar structure for releasable engagement to the side walls.

Figure 14:
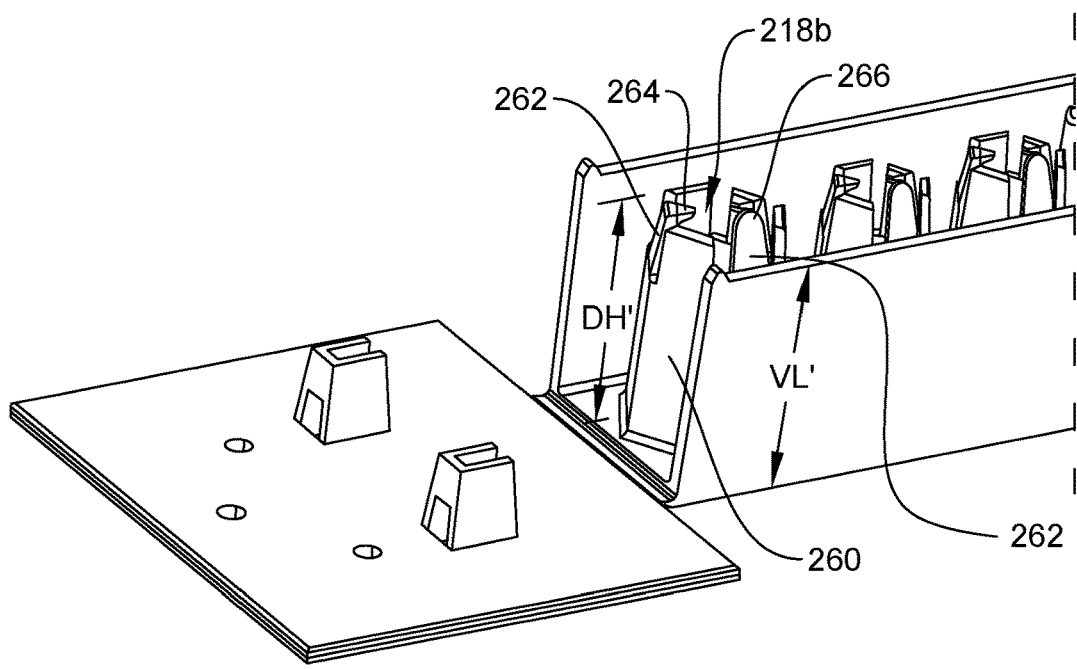
FIG. 14 is another side perspective view of an end of the embodiment of FIGS. 2-6 showing the guide walls of the hexagonal holes.

FIG. 14 is another side perspective view of an end of a support bracket and is described for the embodiment of FIGS. 10-12. FIG. 14 shows the guide walls 260 of the hexagonal holes 218b. Guide walls 260 may include a flexible support 262, which may include a protrusion 264 and a tab 266. Tab 266 may be moved with the user's finger F, fingernail, or a tool to bend flexible support 262 and thus move protrusion 264 away from wire 510, in a manner similar to that shown for the embodiment of FIGS. 2-9 in FIG. 18. Movement of protrusion 266 allows or disallows unobstructed passage of the wire through the hole.

Figure 15:
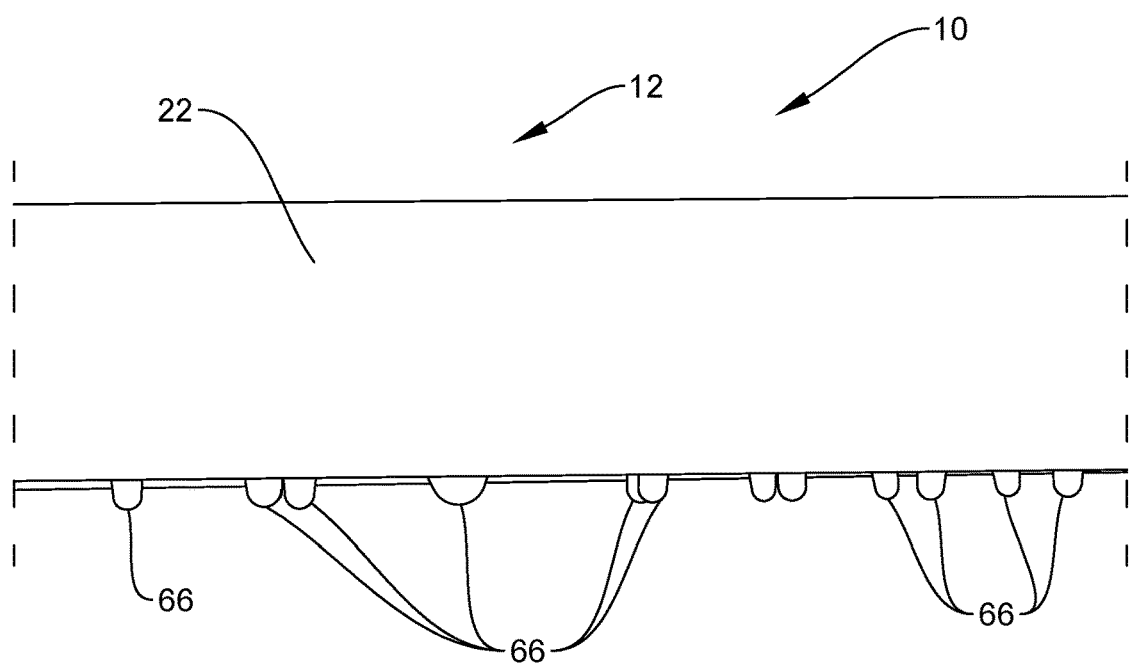
FIG. 15 is a side view of the center of the embodiment of FIGS. 2-6. The extension tabs are easily visible in this drawing.

FIG. 15 is a side view of the center of a support bracket described for the embodiment of FIGS. 2-9. The extension tabs 66 are easily visible in this drawing extending below side wall 22.

Figure 16:
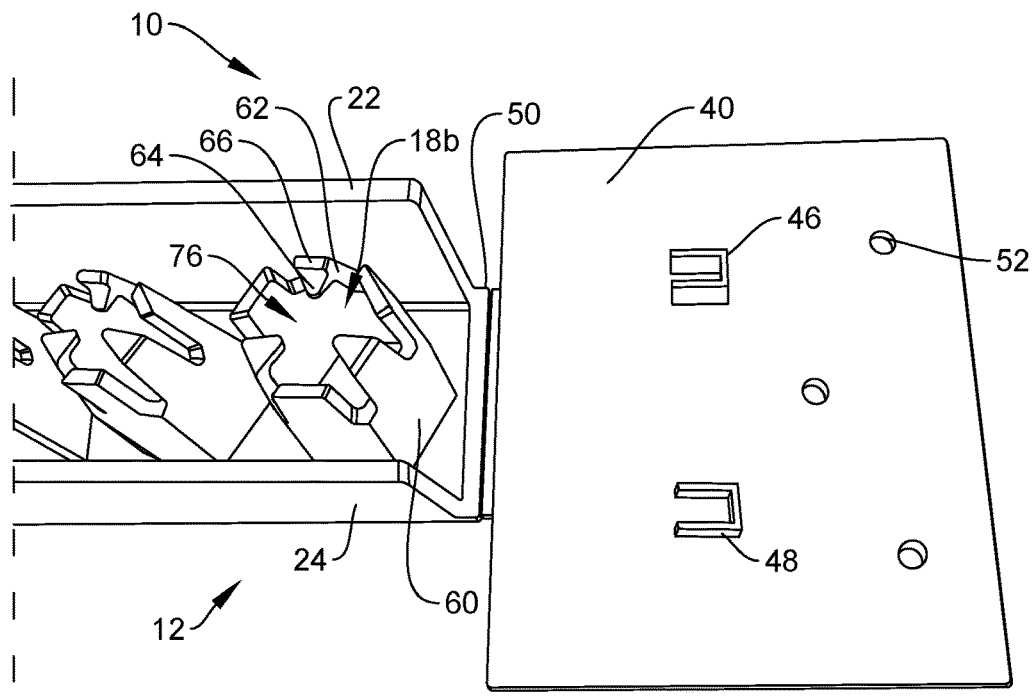
FIG. 16 is a bottom perspective view of one end of the embodiment of FIGS. 2-6 with the end flap folded open.

FIG. 16 is a top perspective view of one end of a support bracket described for the embodiment of FIGS. 2-9. The bracket is shown with end flap 40 folded out at hinge 50. Guide wall 60 at hole 18b is shown here to include flexible support 62 with protrusion 64 and tab 66, which tab can be pulled to draw protrusion 64 away from guide hole 76 to facilitate installing or removing a wire at guide hole 76.

Figure 17:
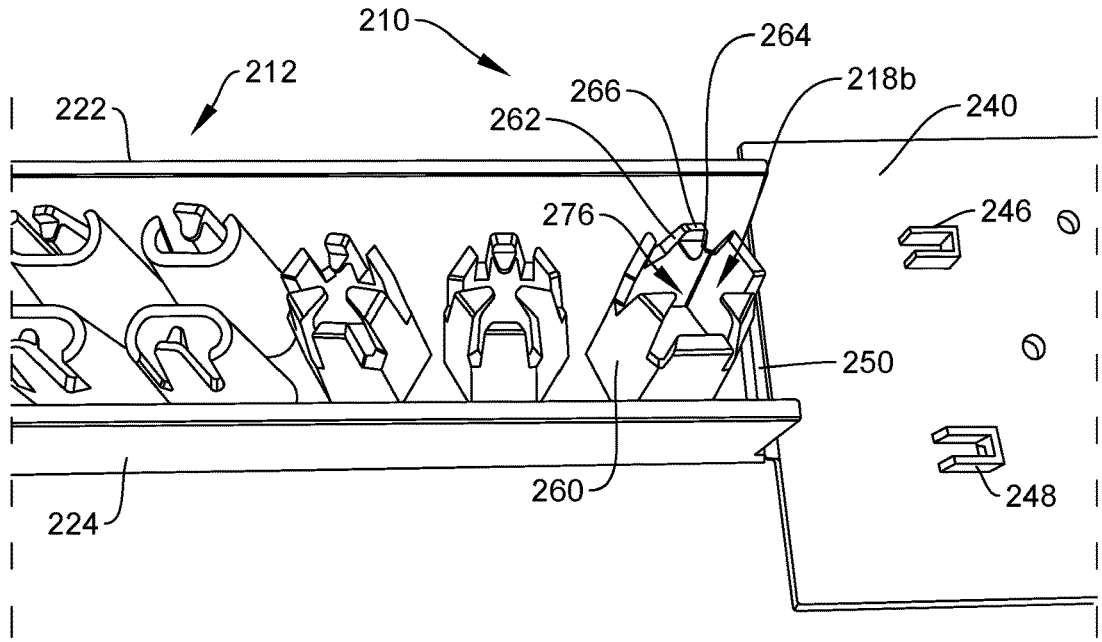
FIG. 17 is another bottom perspective view of one end of the embodiment of FIGS. 2-6 with the end flap folded open.

FIG. 17 is a top perspective view of one end of a support bracket described for the embodiment of FIGS. 10-12. The bracket is shown with the end flap folded out at hinge 250. Guide wall 260 at hole 218*b* is shown here to include flexible support 262 with protrusion 264 and tab 266, which tab can be pulled to draw protrusion 264 away from guide hole 276 to facilitate installing or removing a wire at guide hole 276.

FIG. 18 shows a view from below of a panel wire support bracket installed above an electrical panel, described for the embodiment of FIGS. 2-9. Two wires 510 are shown installed in the bracket, one in each of two guide holes 76. The features of guide wall 60 are visible in this view, including flexible support 62 with protrusion 64 next to one of the wires 510. A finger F is pulling on tab 66 to pull protrusion 64 away from wire 510 which facilitates moving wire 510 relative to guide hole 76.

As described above, support brackets in accordance with some embodiments of the present disclosure are for installing between building studs, which typically are 2×4's or 2×6's. In either case, each stud is installed in a building wall with the narrower dimension facing out and the longer dimension forming an inner face that faces the inner face of the next stud. Thus, the support bracket is intended to be installed in between two stud faces, with the end flaps each coupled to a stud face. The width of the stud faces in the case of 2×4's is about 3½", and in the case of 2×6's is about 1½". A support bracket in accordance with the present disclosure may be formed with structure for optional use with either 2×4's or 2×6's.

Figure 19:
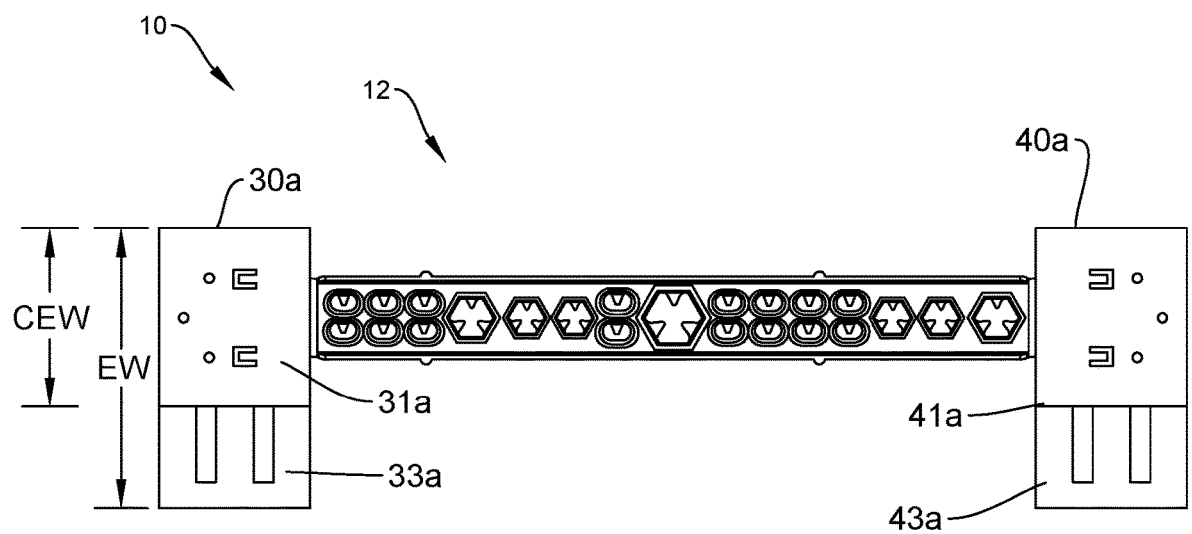
FIG. 19 is bottom view of an embodiment similar to that of FIGS. 2-18 and showing an alternative end flap designed for use with either of two different sizes of building studs, e.g., either 2×4's or 2×6's.

Support bracket 10 for ready use with either 2×4's or 2×6's is shown in FIG. 19 having alternative, extended end flaps 30*a* and 40*a*. The nominal end width EW of flaps 30*a*, 40*a* is sized to fit a larger building stud, e.g., a width of about 5½" for use with 2×6's. Each end flap 30*a*, 40*a* may include a cut line or perforated line 31*a*, 41*a* or other indication for an installer to remove a portion 33*a*, 43*a* of end flaps 30*a*, 40*a* for use with a smaller building stud. For example, when portions 33*a*, 43*a* are cut away, the remaining portion of end flaps 30*a*, 40*a* has a width CEW of about 3½" to correspond to the width of a 2×4.

Further Information

The following paragraphs may provide further information regarding example embodiments. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A preformed panel wire support bracket, comprising a support bar formed with a plurality of holes for locating and slidably supporting a plurality of insulated electrical wires each passing through one of the holes; an end cap including a stud face and a support face, and including a flange extending outwardly from the support face; wherein the end cap is hingedly connected to one end of the support bar; and the end cap may be fastened to an inner face of a building stud, inside a stud wall, with the stud face flush against the stud; and the support bar is thereby supported inside the stud wall by the end cap.

A1. The support bracket of paragraph A0, wherein the end cap is formed with predefined nail holes.

A2. The support bracket of paragraph A0, wherein the plurality of holes extends downward surrounded by a plurality of guide walls.

A3. The support bracket of paragraph A2, further comprising a tooth extending outward from the guide walls wherein the tooth is flexible to create both partially obstructed and unobstructed vertical passage so that an electrical wire may be fished through the passage while the tooth is held in position to create unobstructed passage.

A4. The support bracket of paragraph A0, wherein the preformed end cap defines an end width and an end vertical centerline and the support bar is approximately centered along the vertical centerline.

A5. The support bracket of paragraph A4, wherein the support bar defines a bar width that is less than the end width.

A6. The support bracket of paragraph A0, wherein the support bar includes a lap for protecting the plurality of guide walls.

A7. The support bracket of paragraph A6, wherein the flange comes in contact and holds the lap at the end of the support bar upon the end cap becoming perpendicular to the plane defined by an upper plate of the support bar.

A8. The support bracket of paragraph A0, wherein at least one of the plurality of holes is sized to have a long axis defining a length with approximately parallel flat walls, and a short axis perpendicular to the long axis defining a width, with semicircular end walls connecting the flat walls across the width; the length of the long axis when measured from distal points of the semicircular end walls is approximately twice the width of the short axis; and the width is less than 0.28 inches.

A9. The support bracket of paragraph A0, wherein at least one of the plurality of holes has a hexagonal shape to fit the plurality of insulated electrical wires to pass through one of the holes.

B0. A support bracket for supporting wires above an electrical box, the support bracket comprising a main body formed with a plurality of holes for locating and slidably supporting a plurality of insulated electrical wires each passing through one of the holes; and a first end flap hingedly attached to the main body and including a stud face and a support face; and wherein the first end flap is connected to a first end of the main body; the first end flap includes a first flange and a second flange extending outwards from the support face; the first end flap may be fastened to an inner face of a first building stud, inside a stud wall, with the stud face of the first end flap flush against the first building stud; the support bar is thereby supported inside the stud wall by the first end flap; and wherein the support bar is molded as a single piece.

B1. The support bracket of paragraph B0 further comprising a second end flap wherein the second end flap includes a stud face and a support face; the second end flap is hingedly attached to a second end of the main body; the second end flap includes a first flange and a second flange extending outwards from the support face; the second end flap may be fastened to an inner face of a second building stud, inside the stud wall, with the stud face of the second end flap flush against the second building stud; and the support bar is thereby supported inside the stud wall by the first end flap and the second end flap.

B2. The support bracket of paragraph B0, wherein the first end flap is formed with predefined nail holes.

B3. The support bracket of paragraph B1, wherein the second end flap is formed with predefined nail holes.

B4. The support bracket of paragraph B0, wherein the first end flap defines an end width and an end vertical centerline that passes through a centerpoint of the first end flap; and the support bar is approximately centered along the vertical centerline.

B5. The support bracket of paragraph B4, wherein the main body defines a bar width that is less than the end width.

B6. The support bracket of paragraph B5, wherein the end width is equal to a width of the first building stud.

B7. The support bracket of paragraph B0, wherein the plurality of holes includes holes of a variety of sizes and a variety of shapes; and wherein the plurality of insulated electrical wires includes electrical wires of a variety of types.

B8. The support bracket of paragraph B0, wherein the plurality of holes extends downward from the top surface of the main body; and wherein each of the plurality of holes is surrounded by a plurality of guide walls.

B9. The support bracket of paragraph B8, further comprising a protrusion extending outward from one of the guide walls; wherein the protrusion is attached to a flexible support having a tab that facilitates manipulation by a user; the protrusion creates both a partially obstructed vertical passage and an unobstructed vertical passage as a result of manipulation of the flexible support; an insulated electrical wire may be fished through the passage while the protrusion is held in position to create unobstructed passage.

B10. The support bar of paragraph B0, wherein at least one of the plurality of holes comprises a long axis defining a length; flat walls that are approximately parallel with the long axis; a short axis perpendicular to the long axis defining a width; and semicircular end walls connecting the flat walls across the width.

B11. The support bracket of paragraph B10 wherein the length of the long axis when measured from distal points of the semicircular end walls is approximately twice the width of the short axis.

B12. The support bracket of paragraph B11 wherein width is less than 0.28 inches.

B13. The support bracket of paragraph B0, wherein at least one of the plurality of holes has a hexagonal shape to fit one of the plurality of insulated electrical wires.

B14. The support bracket of paragraph B1 further including a first side wall for protecting the plurality of guide walls.

B15. The support bracket of paragraph B14 further including a second side wall for protecting the plurality of guide walls.

B16. The support bracket of paragraph B15, wherein the first side wall and the second side wall define a vertical length that is greater than a depth of the plurality of holes.

B17. The support bracket of paragraph B16, wherein when the first end flap folds down and becomes perpendicular to the plane defined by the top surface of the main body the first flange of the first end flap comes in contact with and engages the first side wall at the first end of the main body; and the second flange of the first end flap comes in contact with and engages the second side wall at the first end of the main body.

B18. The support bracket of paragraph B17, wherein when the second end flap folds down and becomes perpendicular to the plane defined by the top surface of the main body the first flange of the second end flap comes in contact with and engages the first side wall at the second end of the main body; and the second flange of the second end flap comes in contact with and engages the second side wall at the second end of the main body.

CONCLUSION

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. A panel wire support bracket for supporting a plurality of insulated electrical wires adjacent a building stud, the panel wire support bracket comprising:
    a preformed end cap including a stud face wherein the end cap is configured to be fastened to the building stud with the stud face flush against the building stud;
    a preformed support bar formed with a plurality of holes and a plurality of guide walls that extend downward from the plurality of holes, each guide wall defining a guide tube having an upper opening and a lower opening, wherein the upper opening of each guide tube is configured to receive one of the wires for insertion through the upper opening and the lower opening, the holes and guide walls configured for locating and slidably supporting the plurality of insulated electrical wires each passing through one of the holes;
    wherein at least one of the guide walls includes a plurality of flexible supports arranged in a circular pattern configured to surround the wire passing therethrough, the flexible supports each including a plurality of inwardly extending protrusions configured to contact the wire.

2. The support bracket of claim 1, wherein the plurality of inwardly extending protrusions on the flexible supports extend at substantially right angles from the guide wall.

3. The support bracket of claim 2, further wherein at least one of the plurality of flexible supports on the at least one guide wall further includes a tab operable for moving the protrusion away from contact with the wire.

4. The support bracket of claim 1 wherein at least one of the plurality of holes defines a hexagonal shape.

5. The support bracket of claim 1 wherein at least one of the guide walls extending downward from one of the plurality holes tapers inwardly.

6. The support bracket of claim 1 wherein at least one of the plurality of holes defines a hexagonal shape and the guide wall extending downward from the hexagonally-shaped hole defines a hexagonal shape.

7. The support bracket of claim 6 wherein the guide wall extending downward from the hexagonally-shaped hole tapers inwardly.

8. The support bracket of claim 7, wherein the plurality of inwardly extending protrusions on the flexible supports extend at substantially right angles to the guide wall.

9. The support bracket of claim 8, further wherein at least one of the plurality of flexible supports on the guide wall extending downward from the hexagonally-shaped hole further includes a tab operable for moving the protrusion away from contact with the wire.

10. The support bracket of claim 1 wherein the support bar further comprises an indicator a pre-determined distance from the end cap.

11. The support bracket of claim 1, wherein the at least one guide wall includes at least three flexible supports for the wire.

12. The support bracket of claim 11, wherein the protrusions extend at substantially right angles from the guide wall and are configured to contact the wire.

13. The support bracket of claim 12, wherein at least one of the plurality of flexible supports includes a tab operable for moving the protrusion away from contact with the wire.

14. A panel wire support bracket for supporting a plurality of insulated electrical wires adjacent a building stud, the panel wire support bracket comprising:
   a preformed end cap including a stud face wherein the end cap is configured to be fastened to the building stud with the stud face flush against the building stud;
   a preformed support bar formed with a front surface, a back surface, a plurality of holes, and a plurality of guide walls that extend downward from the plurality of holes, each guide wall defining a guide tube having an upper opening and a lower opening, wherein the upper opening of each guide tube is configured to receive one of the wires for insertion through the upper opening and the lower opening, the holes and guide walls configured for locating and slidably supporting the plurality of insulated electrical wires each passing through one of the holes;
   wherein the end cap is hingedly attached to the support bar further includes a flange with a latching mechanism configured for releasable engaging one of the front and back surfaces.

15. The support bracket of claim 14 wherein the end cap further includes a second flange with a latching mechanism configured for releasable engaging the other one of the front and back surfaces.

16. The support bracket of claim 14 wherein the support bar and the preformed end cap are molded as a single element.

17. The support bracket of claim 16 wherein wherein the latching mechanism includes a slot disposed on the flange configured to receive a knob disposed on one of the front and back surfaces.

18. The support bracket of claim 17 wherein the end cap further includes a second flange with a latching mechanism configured for releasable engaging the other one of the front and back surfaces when the end cap is folded down.

19. A panel wire support bracket for supporting a plurality of insulated electrical wires adjacent a building stud, the panel wire support bracket comprising:
   a preformed end cap including a stud face wherein the end cap is configured to be fastened to the building stud with the stud face flush against the building stud;
   a preformed support bar formed with a plurality of holes and a plurality of guide walls that extend downward from the plurality of holes, each guide wall defining a guide tube having an upper opening and a lower opening, wherein the upper opening of each guide tube is configured to receive one of the wires for insertion through the upper opening and the lower opening, the holes and guide walls configured for locating and slidably supporting the plurality of insulated electrical wires each passing through one of the holes;
   wherein the plurality of guide walls each includes a flexible support formed by two slits in each guide wall, the flexible support disposed between the two slits and configured for supporting the wire inserted in each guide wall.

20. The support bracket of claim 19, wherein each of the flexible supports for the wire further comprises a protrusion on the flexible support, the protrusion configured to contact the wire.

* * * * *